Dec. 21, 1926.
W. G. HAWLEY
STEERING GEAR
Filed Nov. 27, 1925
1,611,587
3 Sheets-Sheet 1
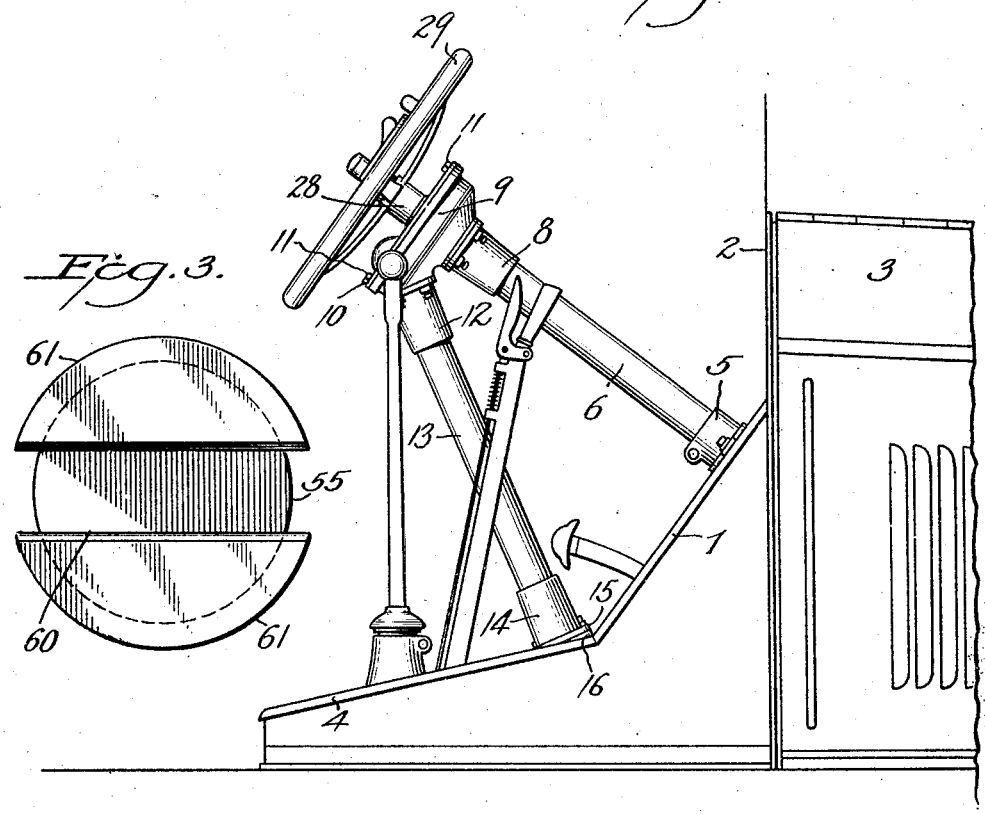
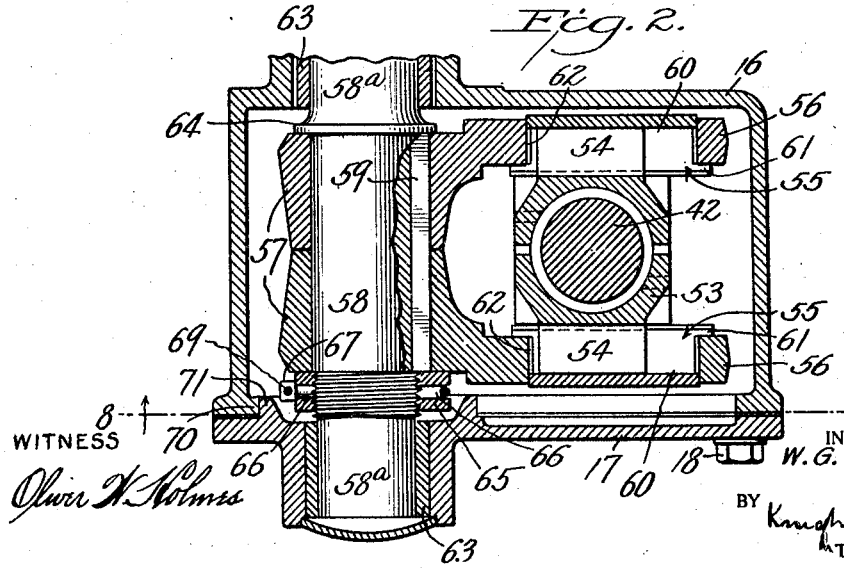

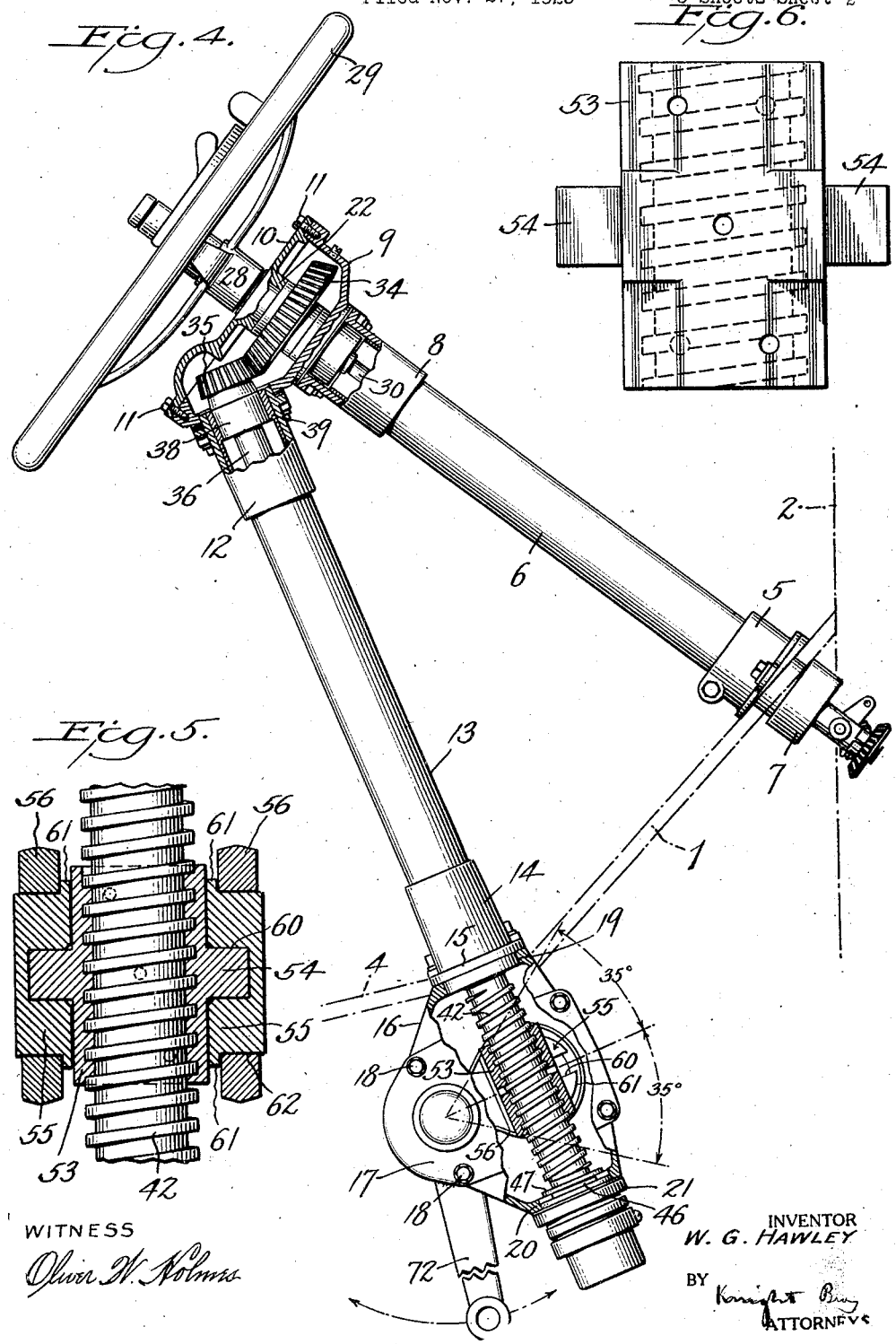

Dec. 21, 1926.
W. G. HAWLEY
1,611,587
STEERING GEAR
Filed Nov. 27, 1925    3 Sheets-Sheet 3
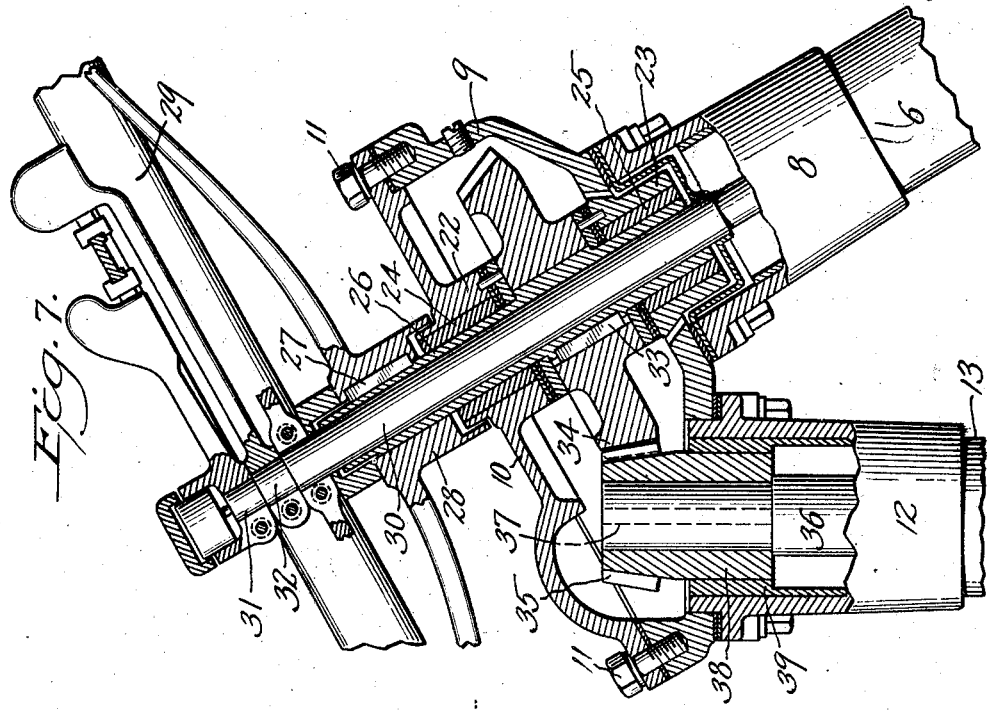
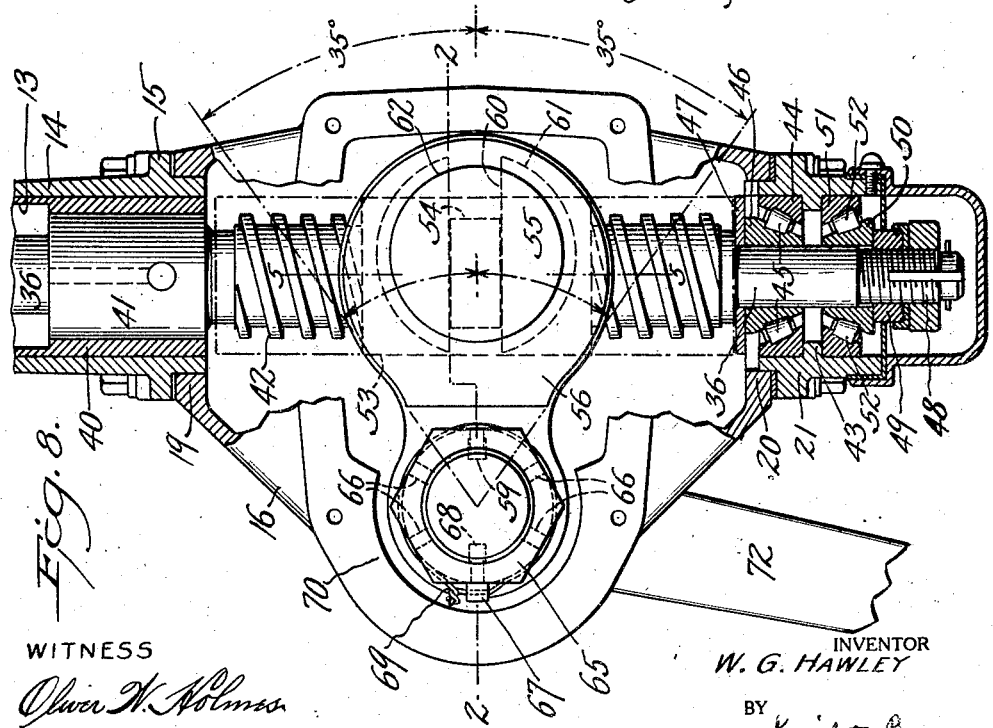
WITNESS
*Oliver N. Holmes*
INVENTOR
*W. G. HAWLEY*
BY
*Knight Bro.*
ATTORNEYS Patented Dec. 21, 1926.

1,611,587

UNITED STATES PATENT OFFICE.

WILLIAM G. HAWLEY, OF ELMIRA, NEW YORK.

STEERING GEAR.

Application filed November 27, 1925. Serial No. 71,672.

The primary object of my invention is to provide an automobile steering gear of improved construction whereby the operation of the hand wheel may be facilitated while at the same time maintaining sufficient irreversibility in the steering gear to prevent a reverse transmission of road shocks from the guiding wheels to the hand wheel.

One of the objects of my invention is to provide an improved construction, combination and arrangement of parts in an automobile steering gear to secure the advantages of an inclined hand-wheel with spark and throttle tubes entering thru the dash and beneath the engine hood, while at the same time locating the steering gear proper in the rear of said hood and below the level thereof in a position where there is ample room for its assembly.

Other and further objects of invention will appear in the specification and be pointed out in the appended claims, reference being had to the accompanying drawings which show a preferred embodiment of my invention.

In the drawings:—

Figure 1 is a side elevation of the control mechanism of an automobile showing my improved steering gear in its relation to the foot board, dash, and hood of the automobile.

Figure 2 is a transverse section of the irreversible connection between steering gear-shaft and steering rock-shaft, said section corresponding to the line 2, 2 of Figure 8.

Figure 3 is an end elevation of one of the slotted crank pin blocks removed.

Figure 4 is an enlarged side elevation of the steering gear detached from the automobile, parts being broken away and parts shown in section.

Figure 5 is a section on the line 5, 5 of Figure 8, showing a portion of the steering gear-shaft in elevation.

Figure 6 is a top plan view of the worm screw nut removed.

Figure 7 is an enlarged fragmentary section showing the operating connections between the hand wheel and steering gear-shaft, parts being broken away and parts shown in elevation.

Figure 8 is a section on the line 8, 8, of Figure 2, parts being broken away and parts shown in elevation.

Housing structure.

The general arrangement of my improved steering gear with respect to the hood of an automobile, may be understood from Figure 1, according to which a dash board 1 slopes downwardly and rearwardly from the rear wall 2 of the engine-housing or hood 3 to a foot-board 4 which extends rearwardly therefrom. Secured to the dash board 1 by means of a collar clamp 5 is a steering post 6 which extends thru the dash-board 1 as indicated in Figure 4 and carries at its lower end a cylindrical enlargement 7. The upper end of the steering post 6 is housed in a coupling collar 8 which serves to connect said post to a gear-housing comprising a bottom portion 9 and a cover plate 10 which is secured in position by means of bolts 11. A second coupling collar 12 which depends from said gear-housing in the rear of said steering post, serves to house and couple to said gear-housing, the upper end of a tubular steering gear-shaft housing 13, the lower end thereof being housed in a coupling collar 14. Bolted to the base flange 15 of the coupling collar 14 is an approximately triangular housing 16 which is provided with a removable cover plate 17 secured in position by bolts 18. As shown best in Figure 8, the housing 16 is provided at its upper end with an attaching flange 19 and at its lower end with a similar flange 20 to which is bolted a cylindrical housing 21 for a double thrust Timken bearing to be hereinafter described in connection with the steering gear-shaft.

Hand-wheel and steering shafts.

Referring now to Figure 7, it will be seen that cover plate 10 is provided with a depending bearing boss 22 coaxially arranged with respect to a lower bearing boss 23 which depends from the bottom of the lower portion 9 of the gear-housing and within the coupling collar 8. Arranged in the bearing bosses 22 and 23 are axially spaced bearings 24 and 25 for a hollow hand-wheel shaft 26. Keyed to the upper end of the hollow shaft 26 by means of a key 27 is the hub 28 of a hand wheel 29. Journaled in a tubular support 30 within the hand-wheel shaft 26 are throttle and spark tubes 31 and 32 which, as shown in Figure 4, extend through the dash and into the space beneath the hood 3. Keyed to the hand-wheel shaft 26 by means of a key 33, is a relatively large bevel gear 34 which meshes with the smaller bevel gear 35 which is keyed to the upper end of a steering gear-shaft 36, by means of a key 37 (shown in dotted lines in Figure 7). For this purpose, the reduced upper end of the shaft 36 carries the elongated hub 38 of gear 35, said hub being journaled within a bearing 39 formed in the upper end of tubular housing 13. Referring now to Figure 8, it will be seen that the lower end of housing 13 is provided with a bearing 40 within which is journaled a cylindrical enlargement 41 on shaft 36. A worm or screw 42 with which the shaft 36 is provided, is of sufficiently low pitch to prevent a reverse transmission of power from the steering arm due to road shocks on the steering wheels and the transmission of such shocks back to the hand wheel. For this purpose, a lead of approximately 10° is sufficient but such a low pitch in a steering worm or screw requires a corresponding large number of turns of the steering shaft 36 for producing the usual steering operations. In order, however, to retain this irreversibility and at the same time reduce the number of turns required for the hand-wheel shaft 26, I employ a multiplying gear connection between the said hand-wheel and steering shafts, comprising in the present embodiment of my invention, the bevel gears 34 and 35. From an inspection of the lower portion of Figure 8, it will be seen that the Timken housing 21 is provided with an inwardly-presented rib 43 upon which is supported an upwardly-presented Timken race ring 44, a series of Timken rollers 45 being interposed between it and an upper conical Timken ring 46 carried by the lower end of shaft 36. Interposed between Timken ring 46 and the lower end of worm or screw 42, is a bearing ring 47 which transmits the weight and downward thrust of steering shaft 36 to the upper Timken bearing section. Threaded to the reduced lower end 48 of shaft 36, is a bearing nut 49 which supports a conical Timken ring 50 carried by the lower end of shaft 36 and between which and a downwardly-presented race ring 51 are arranged Timken rollers 52. This lower section of the Timken bearing is thus adapted to take an upward thrust which is transmitted to the under side of rib 43.

By means of this double construction for taking up the end thrust in either direction, a bearing of much smaller diameter may be used than where one Timken bearing is placed at the upper end of the worm and another Timken bearing at the lower end thereof.

*Worm and rock-shaft connection.*

Referring more especially to Figures 2, 3, 5, 6 and 8, threaded upon the worm or screw 42, is a nut 53 which is provided with oppositely-presented lugs or wings 54 of rectangular cross-section. By means of these projections or lugs, said nut is adapted to reciprocably engage laterally-spaced crank-pins 55, said crank-pins being freely journaled in crank-arms 56 provided with abutting hubs 57 which are keyed to a steering rock shaft 58 by means of a key 59. As shown in Figures 2 and 3, each of the crank-pins 55 is provided with a diametral slot 60, these slots being presented from opposite sides toward the nut 53 to receive the squared lugs or wings 54. Adjacent said nut, each of said crank-pins is provided with segmental flanges 61 which limit the axial displacement of said crank-pins within the alined crank-pin openings 62 in the crank-arms 56. As shown in Figure 5, the inwardly-presented faces of crank-pins 55 slidably engage the opposite parallel faces of nut 53, the contacting surfaces of these parts being suitably finished for this purpose. In order to facilitate the assembly of the foregoing parts, the journals 58ᵃ of the steering rock-shaft 58, are arranged in axially spaced bearings 63, one of said bearings being mounted in the side wall of housing 16 and the other of said bearings being carried by the cover plate 17. In order to properly locate the crank-arms 56 axially with respect to steering rock-shaft 58, said rock-shaft is provided with a peripheral flange 64 between which and a nut 65 the hubs of said crank-arms are confined. As shown in Figure 8, the nut 65 is provided with radial sockets 66 into any one of which a set-screw or stud 67 may be inserted when that particular socket is brought into register with a recess 68 (see dotted lines in Figure 8). A locking wire 69 arranged in suitable notches in the perimetral corners of nut 65 and extending thru the head of screw or stud 67, prevents displacement of the latter. It will be understood from the foregoing description that when the cover plate 17 is removed from housing 16, the steering rock-shaft 58, together with crank-arms 56, crank-pins 55, and nut 53 may be introduced thru the uncovered opening into housing 16. The parts thus assembled are adapted to be connected up with screw 42 and the cover plate applied, the latter step serving to aline the steering rock-shaft bearings in virtue of the relationship existing between interengaging portions of the housing and cover plate. For this purpose, an inwardly presented flange 70 extends around the opening in housing 16, said cover plate being provided with an inwardly presented flange 71 which interengages with the flange 70 and serves to locate the steering rock-shaft bearings by means of a bored surface extending considerably over 180 degrees about the axis of said shaft. Keyed to the outer end of steering rock-shaft 58 is a steering arm 72.

I claim:—

1. In an automobile provided with an engine-housing hood, the combination with a hand-wheel shaft arranged on an axis inclined to and intersecting the rear wall of said hood, of a steering-shaft arranged on an axis deviating downwardly from the upper end of said hand-wheel shaft and terminating in the rear of said rear wall of the hood, steering connections connected to the lower end of said steering-shaft, and operating connections between the upper ends of said steering and hand-wheel shafts.

2. In an automobile provided with an engine-housing hood and a flooring extending downwardly and rearwardly from the rear wall of said hood, the combination with a hollow hand-wheel shaft, of spark and throttle tubes arranged therein and extending through said flooring and the rear wall of said hood, a steering-shaft arranged below and to the rear of said hand-wheel shaft, said shafts being geared together at the top, and operating connections connected to said steering-shaft below said flooring.

3. In an automobile provided with an engine-housing hood, the combination with a hollow hand-wheel shaft, of spark and throttle tubes arranged therein and extending through the rear wall of said hood, a steering-shaft arranged below and terminating to the rear of said rear wall of the hood, steering-arm connections connected to the lower end of said steering-shaft, and a power-connection between the upper end of said steering-shaft and said hand-wheel shaft.

4. In an automobile provided with an engine-housing hood and flooring extending downwardly and rearwardly from the rear wall of said hood, the combination with a hollow hand-wheel shaft, spark and throttle tubes arranged therein and extending through said flooring and the rear wall of said hood, a steering-shaft extending through said flooring in the rear of said rear wall of the hood, steering connections arranged below said flooring and connected to the lower end of said steering-shaft, and a power-connection between the upper end of said steering-shaft and said hand-wheel shaft.

5. In an automobile provided with an engine-housing hood, the combination with a steering post inclined with respect to the rear wall of said hood, of a steering-shaft housing deviating downwardly and rearwardly from said steering post, a gear housing rigidly connecting the upper ends of said steering post and steering shaft housing, a hand-wheel shaft journaled in said steering post, a steering shaft journaled in said steering-shaft housing, and gearing in said gear-housing for operatably connecting the upper ends of said hand-wheel and steering shafts.

6. In an automobile, the combination with an engine-housing hood, of a dash-board inclined downwardly and rearwardly from the rear wall of said hood, a foot-board extending rearwardly from the rear edge of said dash-board, a steering post mounted on said dash-board adjacent to the rear wall of said hood, a steering shaft housing mounted on said foot-board, a gear housing rigidly connecting the upper ends of said steering post and steering shaft housing, a hollow hand-wheel shaft journaled in said steering post, a steering shaft journalled in said steering shaft housing, gears in said gear housing for connecting the upper ends of said hand wheel shaft and said steering shaft, steering connections arranged below said foot-board and operatably connected to the lower end of said steering shaft, and a housing for said steering connections connected to the lower end of said steering shaft housing.

7. In an automobile provided with an engine-housing hood, the combination with the rear wall of said hood, of a steering post and a steering-shaft housing rigidly connected at their upper ends and deviating downwardly, a hand-wheel shaft journaled in said steering post, a steering shaft journaled in said steering-shaft housing, gearing for operatably connecting the upper ends of said hand wheel shaft and said steering shaft, and steering connections operatably connected to the lower end of said steering shaft.

8. In an automobile provided with an engine-housing hood and a dash and foot-board extending downwardly and rearwardly from the rear wall of said hood, the combination with a steering post inclined with respect to said rear wall of the hood, a steering-shaft housing deviating downwardly from and in the rear of said steering post, a gear housing rigidly connecting the upper ends of said steering post and steering shaft housing, a hand-wheel shaft journaled in said steering post, a steering shaft journaled in said steering-shaft housing, gearing in said gear-housing for operatably connecting the upper ends of said hand wheel shaft and said steering shaft, and steering connections operatably connected to the lower end of said steering shaft.

9. The combination with an automobile provided with an engine-housing hood, of a hollow hand-wheel shaft arranged on an axis which intersects the rear wall of said hood, spark and throttle shafts arranged within said hand-wheel shaft and extending thru the rear wall of said hood, a steering shaft, operating connections between said hand-wheel and steering shafts, and steering connections connected up to said steering shaft, said steering connections being arranged to the rear of said rear wall of the hood.

WILLIAM G. HAWLEY.